United States Patent [19]

Ohouchi

[11] Patent Number: 4,650,970
[45] Date of Patent: Mar. 17, 1987

[54] SIMULTANEOUS DISPLAY OF NET AND GROSS WEIGHT OF FOOD IN A HEATING APPLIANCE

[75] Inventor: Mituo Ohouchi, Nara, Japan

[73] Assignee: Sharp Kabushiki Kaisha, Osaka, Japan

[21] Appl. No.: 789,786

[22] Filed: Oct. 21, 1985

[30] Foreign Application Priority Data

Oct. 22, 1984 [JP] Japan .......................... 59-160709[U]

[51] Int. Cl.4 ............................................. H05B 6/68
[52] U.S. Cl. .............................. 219/506; 219/10.55 B; 219/518; 177/6; 99/325
[58] Field of Search .................. 219/10.55 B, 10.55 R, 219/506, 518; 177/4, 5, 6; 99/325

[56] References Cited

U.S. PATENT DOCUMENTS

| | | | |
|---|---|---|---|
| 2,482,726 | 9/1949 | Clements | 177/6 X |
| 3,890,825 | 6/1975 | Davis | 219/10.55 B X |
| 4,301,878 | 11/1981 | Soe | 177/5 |
| 4,399,352 | 8/1983 | Ueda | 219/10.55 B X |
| 4,508,948 | 4/1985 | Carlson | 219/10.55 B |

Primary Examiner—Philip H. Leung
Attorney, Agent, or Firm—Birch, Stewart, Kolasch & Birch

[57] ABSTRACT

A heating appliance includes a heating chamber for accommodating a food to be heated and a casing carrying the food, a weight measuring device for measuring a tare weight of the casing and a gross weight of the casing and the food disposed in the heating chamber, a calculation circuit for calculating a net weight of the food in response to the output of the weight measuring device, a first display for displaying the net weight of the food, and a second display for displaying the gross weight of the casing and the food.

9 Claims, 5 Drawing Figures

SIMULTANEOUS DISPLAY OF NET AND GROSS WEIGHT OF FOOD IN A HEATING APPLIANCE

BACKGROUND OF THE INVENTION

The present invention relates to a heating appliance and, more particularly, to a heating appliance including a weight measuring device and a display device which can display a weight of an object or a food disposed in the heating chamber in response to the operation of the weight measuring device.

In a heating appliance in an art related to that of the present invention, a weight of a food to be heated is measured by a weight measuring device disposed in the heating appliance. While the food is heated, the food is disposed in a casing. Therefore, after a tare weight of the casing is measured, the gross weight of the food to be heated and the casing is measured, and then, the net weight of the food to be heated is displayed by decreasing the gross weight by the tare weight. However, because the gross weight and the net weight are not simultaneously displayed, it is difficult to judge which of the gross weight of the food and the casing, and the net weight of the food to be heated is measured and displayed.

It is desired that a novel heating appliance be provided to judge which of the gross weight of the food and the casing, and the net weight of the food is measured and displayed.

SUMMARY OF THE INVENTION

Accordingly, it is an object of the present invention to provide an improved heating appliance which can judge whether a net weight of a food to be heated is measured.

It is another object of the present invention to provide an improved heating appliance which can simultaneously display a net weight of a food to be heated, and a gross weight of the food to be heated and a casing carrying the food.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a heating appliance comprises a heating chamber for accomodating a food to be heated within a casing carrying the food, weight measuring means for measuring a tare weight of the casing and a gross weight of the casing and the food disposed in the heating chamber, calculation means for calculating a net weight of the food responsive to the output of the weight measuring means, first display means for displaying the net weight of the food, and second display means for displaying the gross weight of the casing and the food.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
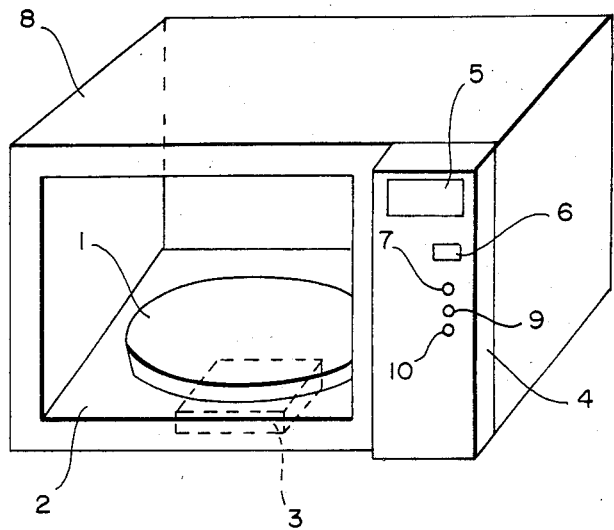
FIG. 1 shows a perspective view of a heating appliance of an embodiment of the present invention when an appliance door is removed therefrom.

A preferred embodiment of the present invention is now described in terms of a microwave oven although the invention is not limited to the microwave oven. FIG. 1 shows a perspective view of a microwave oven including a weight measuring device and a display device according to an embodiment of the present invention when the microwave oven door is removed. A heating chamber 2 is provided in an external casing 8, while a magnetron (not shown) generating microwaves is provided in the upper part of the heating chamber 2. A turntable 1 is disposed on the inner bottom wall of the heating chamber 2. A food to be heated by the microwaves or other heating means is carried and accommodated in a casing. The casing with the food is disposed on the turntable 1. When the food is heated, the turntable 1 is rotated. If necessary, a heater (not shown) is provided in the heating chamber 2 for heating the food by the heat of the heater.

A weight measuring device 3 is disposed under the heating chamber 2 for measuring a weight of an object or a food disposed on the turntable 1. It is assumed that the weight of either the food to be heated with the casing carrying the food or the casing itself is measured. For example, the weight measuring device 3 is disclosed in U.S. patent application Ser. No. 724,072 filed on Apr. 16, 1985, entitled "FOOD WEIGHT MEASURING DEVICE FOR COOKING APPLIANCE" by Taisuke MORINO et al. The British counterpart is application No. 8509781 filed on Apr. 17, 1985, and the counterpart in West Germany is application No. P3514505.6 filed on Apr. 22, 1985.

A control panel 4 is provided on a front of the microwave oven, and comprises a heating time switch 9 for setting or selecting a heating period of time, a temperature selection switch 10 for setting or selecting a heating temperature in a heating chamber 2 when heating, a weight measuring start switch 6 for starting the weight measuring operation of the weight measuring device 3, a weight measuring stop button 7 for stopping the weight measuring operation, and a display device 5 for displaying the weight of the object or the food measured by the weight measuring device 3, the heating period of time (or the remaining heating time), the heating temperature in the heating chamber 2, and the current time. The display device 5 includes a first display area 11 for digitally displaying the weight of the food or the object, the heating period time (or the remaining heating time), the current time, and a second display area 12 for graphically displaying the weight of the object and the heating temperature in the heating chamber 2.

The microwave oven used in the present invention, preferably, has three heating operation modes as follows:

(1) Microwave Heating Mode:
A food to be heated is heated by the microwaves.
(2) Oven Heating Mode:
A food to be heated is heated by a convection heating. In this case, the heat of the heater is circulated in the heating chamber 2.
(3) Grill Heating Mode:
A food to be heated is heated by both the microwaves and the heat of the heater. The heated food is beatifully browned by the heat of the heater.

Figure 2:
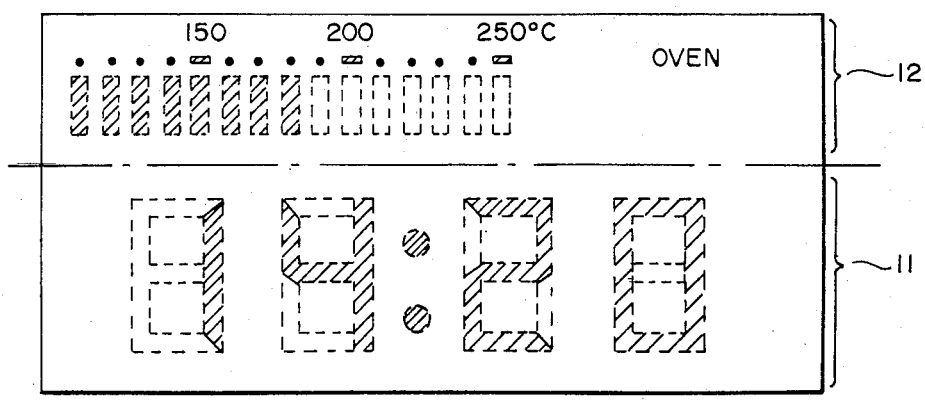
FIG. 2 shows a front view of a display device of the heating appliance according to an embodiment of the present invention when oven heating is performed.
Figure 4:
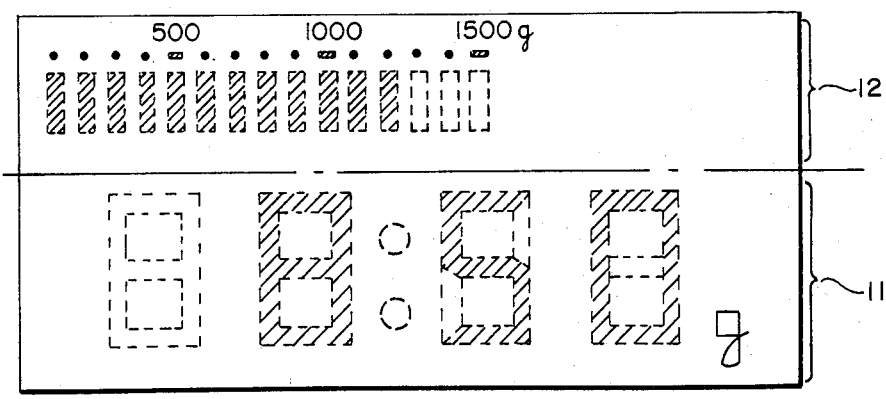
FIG. 4 shows a front view of the display device of the heating appliance according to an embodiment of the present invention when a weight measuring step is carried out.
Figure 5:
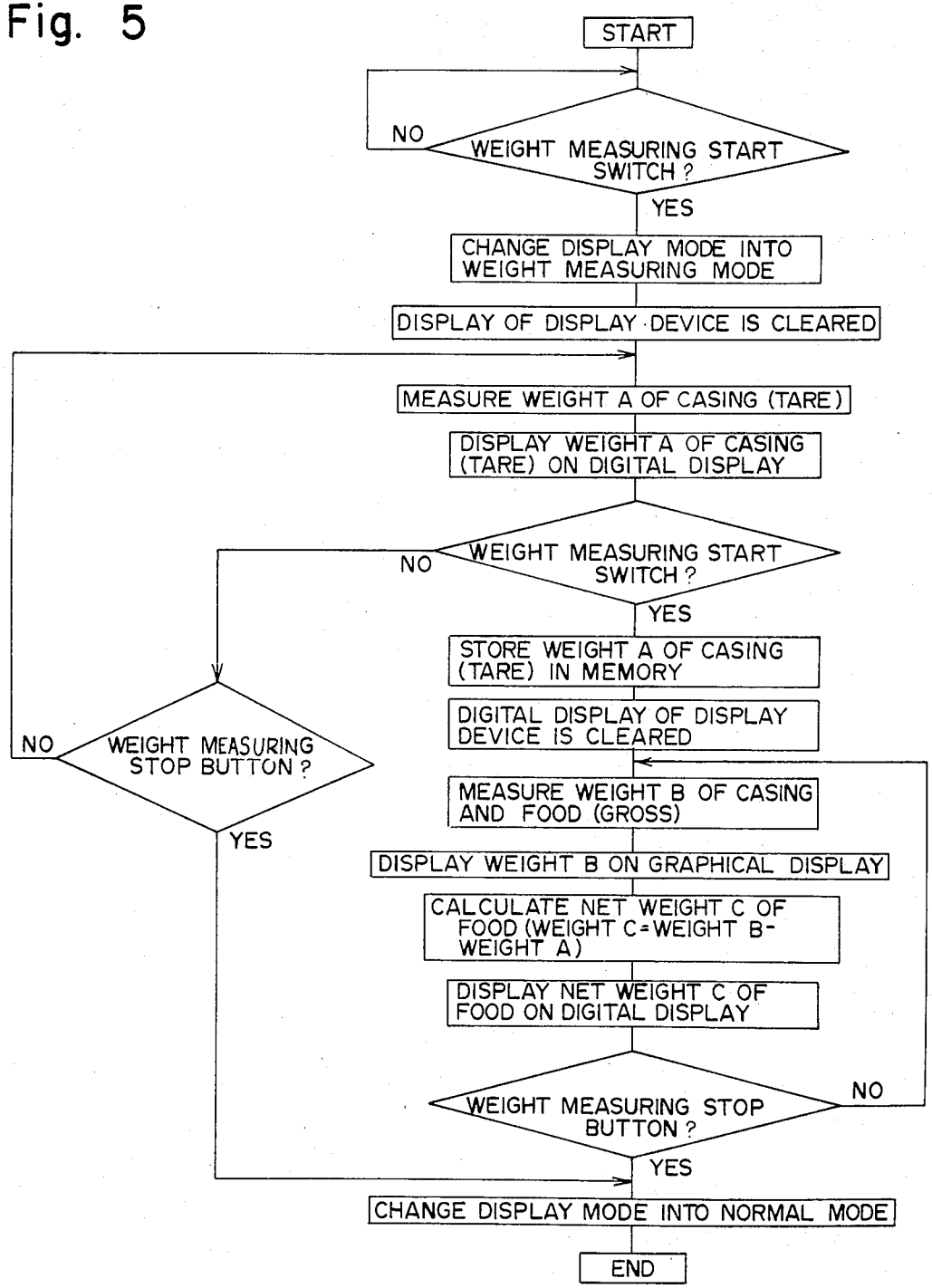
FIG. 5 shows a flowchart for explaining the weight operation of the heating appliance according to an embodiment of the present invention.

The display device 5, preferably, has three display modes as follows:

(1) Heating Mode:
When the heating operation such as the oven heating, the microwave heating, or the grill heating is carried out, the heating period of time (or the remaining heating time), the heating temperature in the heating chamber 2, and a heating condition are displayed as shown in FIG. 2. The heating condition is displayed for the operator to judge whether any heating operation is carried out.
(2) Weight Measuring Mode:
When the weight measuring start switch 6 is switched on, and then, the weight measuring operation of the weight measuring device 3 is carried out, the weight of the food or the object disposed in the turntable 1 of the heating chamber 2 is measured. Therefore, the net weight of the food and the weight of the object are displayed on the display device 5 as shown in FIG. 4.
(3) Normal Mode:
When the heating and the weight measuring operations are not carried out, the current time is displayed on the display device 5. For this purpose, a timepiece is provided in the microwave oven for counting the current time.

The control panel 4, further, includes a heating selection switch for selecting one of the heating operation modes, and a heating start switch for starting the heating operation.

FIG. 2 shows a front view of a display device 5 of the microwave oven according to an embodiment of the present invention when the oven heating is carried out. The heating period of time or the remaining heating time is digitally displayed on the first digital display area 11. In this case, display portions indicated by the oblique lines of FIG. 2 are enabled by a digital display control signal from a microcomputer 13. The heating temperature in the heating chamber 2 is graphically displayed on the second and graphical display area 12. In this case, display portions indicated by the oblique lines of FIG. 2 are enabled by a graphical display control signal from the microcomputer 13 responsive to the temperature in the heating chamber 2.

In the display device 5, when the oven heating is carried out, the heating temperature in the heating chamber 2 is graphically displayed on the graphical display area 12 by using a plurality of bar-like display portions. To read or understand the heating temperature in the heating chamber 2 from the graphically display portions, temperature indicators (for example, 150 degrees C., 200 degrees C., and 250 degrees C.) are provided along the bar-like displaying portions on the graphical display area 12 of the display device 5. The temperature indicators may appear at least when the display device 5 is in the heating mode.

The display in the heating mode when selecting one of the other heating operations becomes as shown in FIG. 2.

Figure 3:
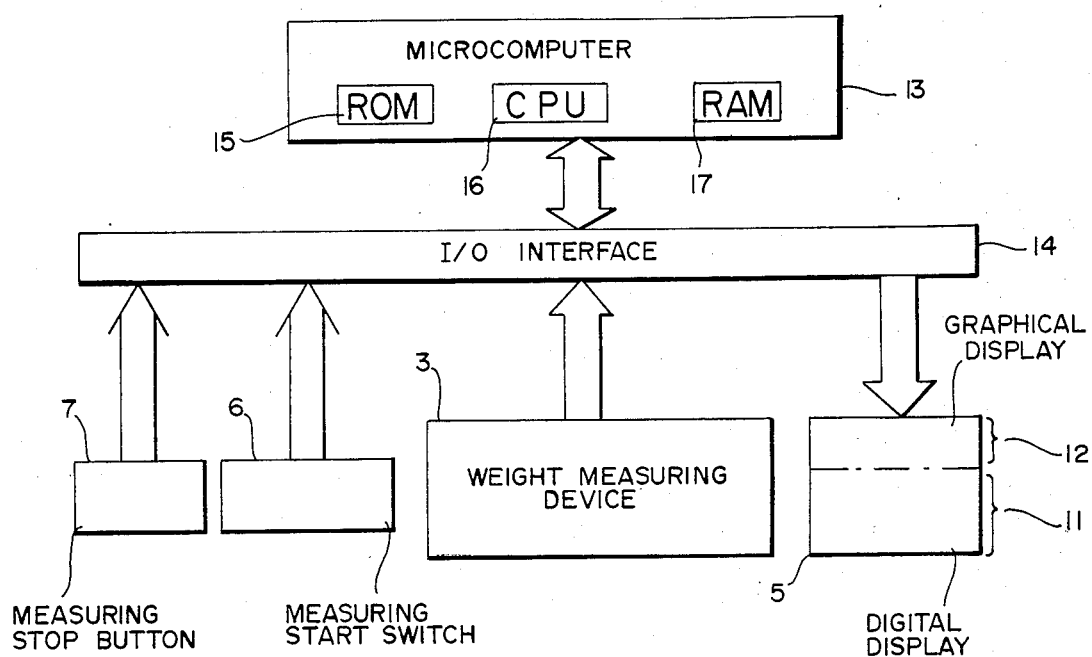
FIG. 3 shows a block diagram of the heating appliance of an embodiment of the present invention.

FIG. 3 shows a block diagram of the microwave oven according to an embodiment of the present invention. The microcomputer 13 comprises a central processing unit (CPU) 16, a random access memory (RAM) 15, and a read only memory (ROM) 17. When the weight measuring start switch 6 is switched on, an input signal from the weight measuring start switch 6 provided on the control panel 4 is applied to the microcomputer 13 through an interface 14, and then, the display device 5 becomes in the weight measuring mode. At the same time, the weight measuring start signal from the microcomputer 13 is applied to the weight measuring device 3. Therefore, the weight of the food or the object disposed on the turntable 1 in the heating chamber 2 is measured by the weight measuring device 5. When the weight of the food or the object is applied to the microcomputer 13 through the interface 14, the weight of the food or the object is displayed on the digital display area 11 of the display device 5 based on a program stored in the ROM 15. When the weight measuring stop button 7 is pressed and switched on after the weight of the food or the object is measured, the output signal from the weight measuring stop button 7 is applied to the microcomputer 13 through the interface 14, and then, the measuring operation stop signal from the microcomputer 13 is applied to the weight measuring device 3 so as to stop the operation of the weight measuring device 3. When the weight measuring operation is stopped, the display mode of the display device 5 is changed to the normal mode or the heating mode from the weight measuring mode.

The display operation of the present invention will be described with reference to FIG. 3 when the weight operation is carried out. It is assumed that the net weight of the food to be heated is measured so as to set a heating period of time. The weight measuring start switch 6 is switched on so as to change the display mode into the weight measuring mode from the normal mode as shown in FIG. 4. In the normal mode, the current time is digitally displayed on the digital display area 11 of the display device 5. The display of the display device 5 is cleared in response to the switching of the weight measuring start switch 6. The casing for carrying the food to be heated is disposed on the turntable 1 in the heating chamber 2, and the tare weight A of the casing is measured by the weight measuring device 3. The tare weight A of the casing is digitally displayed on the digital display area 11 of the display device 5 responsive to the control signal from the microcomputer 13 based on the stored program in the ROM 15. After the casing is removed from the turntable 1 in the heating chamber 2, the weight measuring start switch 6 is switched on to store the tare weight A of the casing into the RAM 17 of the microcomputer 13. When the tare weight A of the casing is stored in the RAM 17, the display of the display device 5 is cleared. Next, the food to be heated provided in the casing is disposed on the turntable 1, and then, the gross weight B of the food to be heated and the casing is measured by the weight measuring device 3. The gross weight B of the food and the casing is graphically displayed on the graphical display area 12 responsive to the control signal from the microcomputer 13 based on the stored program in the ROM 15. At the same time, the net weight C of the food to be heated is calculated by the microcomputer 13 based on the stored program in the ROM 15 and is digitally displayed on the digital display area 11 of the display device 5. The calculation of the net weight C of the food is B (the gross weight) minus A (the tare weight). (C=B−A)

Accordingly, the heating period of time and/or the heating temperature are/is manually or automatically selected based on the net weight of the food to be heated or the gross weight of the food and the casing. The gross weight of the food and the casing is graphically displayed on the graphical display area 12, while the net weight of the food is digitally displayed on the digital display area. When the gross weight of the food and the casing is graphically displayed, the display portions indicated by the oblique lines of FIG. 4 are enabled by the graphical display control signal from the microcomputer 13 responsive to the operation of the weight measuring device 3. When the net weight of the food is digitally displayed, the display portions by indicated by the oblique lines of FIG. 4 are enabled by the digital display control signal from the microcomputer 13 in response to the calculation of the net weight.

In the weight measuring mode as shown in FIG. 4, the weight indicators (for example, 500 g, 1000 g, and 1500 g) is provided on the graphical display area 9. The gross weight of the food and the casing is graphically displayed on the graphical display area 12 by using the plurality of the bar-like display portions. To read or understand the gross weight of the food and the casing, the weight indicators are provided along the bar-like displaying portions. The weight indicators may appear at least when the display device 5 is in the weight measuring mode.

When the weight measuring mode is canceled, the weight measuring stop button 7 is pressed and switched on and the display mode is changed to the normal mode.

When the selection of the heating period of time and/or the heating temperature is automatically carried out after the measuring operation is carried out, the weight measuring mode is changed to the heating mode as shown in FIG. 2. If the heating start button is pressed in the heating mode, the heating is carried out, the remaining heating time is displayed on the digital display area 11, and the heating temperature is displayed on the graphical display area 12.

When the heating time, the heating temperature, or the heating condition is manually selected, the display mode is change to the heating mode as shown in FIG. 2 from the normal mode or the weight measuring mode by switching on the heating time selection switch 9, the heating selection switch, or the heating temperature selection switch. The heating period of time, the heating temperature in the heating chamber 2, and the heating condition are selected by the desired buttons. After selecting, the heating start button is pressed to start the heating operation.

As shown in FIGS. 2 and 4, the same display device 5 is used in the weight measuring mode, the heating mode, and the normal mode. The digital display area 11 is used for displaying the net weight of the food to be heated in the weight measuring mode, the heating period or the remaining heating time in the heating mode, the current time in the normal mode. The graphical display area 12 is used for displaying the gross weight of the food and the casing in the weight measuring mode, and the heating temperature in the heating chamber 2 in the heating mode. The graphical display area 12 may be not used in the normal mode. The weight indicators and the temperature indicators are alternatively displayed on the graphical display area 12 responsive to the change between the heating mode and the weight measuring mode.

In the weight measuring mode of the display device 5, the display of a weight indicator "g" may be provided on the digital display area 11. In the heating mode of the display device 5, the display of the time indicator "m" (miniute) may be provided on the digital display area 11.

As described above, the heating appliance comprises the weight measuring device for measuring the object or the food on the turntable in the heating chamber, the display device for displaying the weight of the object or the food, the heating period of time, the remaining heating time, or the heating temperature in the heating chamber, the display device comprising the graphical display area for graphically displaying the gross weight of the food and the casing, and the digital display area for digitally displaying the net weight of the food to be heated. Needless to say, in the weight measuring mode, the values in the digital display area are necessary smaller than the values displayed in the graphical display area. Accordingly, it is easily detected which of the net weight of the food, and the gross weight of the food and the casing is measured and displayed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A heating appliance comprising:
   heating chamber means for receiving a food to be heated, said food to be heated being contained in a casing;
   weight measuring means for measuring a tare weight of said casing and a gross weight of said casing with said food to be heated contained therein and producing outputs representative of said weights;
   calculation means, responsive to the outputs of said weight measuring means, for calculating a net weight of the food to be heated;
   a decimal segment display displaying the net weight of the food in a first mode; and
   a graphical bar display displaying the gross weight of the casing and the food contained therein in the first mode;
   said decimal segment display and said graphical bar display displaying disparate information in a second mode;
   said decimal segment display and graphical bar display simultaneously displaying said gross weight and said net weight to prevent a viewer of the displayed information from confusing said net weight with said gross weight.

2. The heating appliance of claim 1 wherein said weight measuring means is disposed in said heating chamber means.

3. The heating appliance of claim 1 wherein said second display means displays a cooking temperature in said second mode.

4. The heating appliance of claim 3 wherein said first display means displays a cooking time in said second mode.

5. The heating appliance of claim 4 wherein said first display means includes a colon when displaying said cooking time and a weight indicia when displaying said net weight.

6. The heating appliance of claim 5 wherein said second display means includes temperature indicia when displaying said cooking temperature and weight indicia when displaying said gross weight.

7. In a heating appliance having a heating chamber for receiving a food to be heated containable in a heating container, means for detecting a temperature related to said food, and means for weighing said food and developing an output representative of a weight of said food; a display device comprising:
- a first display for displaying a heating time in a first mode; and
- a second display for displaying said temperature related to said food in said first mode;
- said means for weighing measuring a tare weight of said container and a gross weight of said container with said food to be heated contained therein and developing a first output representative of said gross weight and a second output representative of a net weight of said food only;
- said first display being responsive to said second output to display said net weight and said second display being responsive to said first output to simultaneously display said gross weight when in a second mode to prevent a viewer of the displayed information from confusing said net weight with said gross weight.

8. The display device of claim 7 wherein said second display is a graphical bar display, said bar display being labelled with temperature indicia in said first mode and weight indicia in said second mode.

9. The display device of claim 8 wherein said first display is a segmented decimal display which displays a colon in said first mode and a weight indicia in said second mode.

* * * * *